(12) United States Patent
Maeshima

(10) Patent No.: US 9,805,754 B2
(45) Date of Patent: Oct. 31, 2017

(54) FERRIMAGNETIC PARTICLE POWDER AND MANUFACTURING METHOD THEREFOR, AND MAGNETIC RECORDING MEDIUM AND MANUFACTURING METHOD THEREFOR

(71) Applicant: SONY CORPORATION, Tokyo (JP)

(72) Inventor: Katsunori Maeshima, Minato-ku (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/901,884

(22) PCT Filed: Jul. 17, 2014

(86) PCT No.: PCT/JP2014/003784
§ 371 (c)(1),
(2) Date: Dec. 29, 2015

(87) PCT Pub. No.: WO2015/025465
PCT Pub. Date: Feb. 26, 2015

(65) Prior Publication Data
US 2016/0372145 A1  Dec. 22, 2016

(30) Foreign Application Priority Data
Aug. 23, 2013  (JP) ................ 2013-173869

(51) Int. Cl.
G11B 5/706 (2006.01)
G11B 5/64 (2006.01)
G11B 5/714 (2006.01)
G11B 5/84 (2006.01)

(52) U.S. Cl.
CPC ............ *G11B 5/64* (2013.01); *G11B 5/70678* (2013.01); *G11B 5/714* (2013.01); *G11B 5/84* (2013.01)

(58) Field of Classification Search
None
See application file for complete search history.

(56) References Cited

U.S. PATENT DOCUMENTS

2004/0253483 A1* 12/2004 Watanabe ............ G11B 5/714
428/844
2009/0168265 A1  7/2009 Harasawa et al.
2009/0174969 A1  7/2009 Tada et al.
2012/0251844 A1* 10/2012 Yamazaki ............ H01F 1/11
428/800

(Continued)

FOREIGN PATENT DOCUMENTS

EP  0178269 A2  4/1986
EP  2237288 A1  10/2010

(Continued)

OTHER PUBLICATIONS

Extended European Search Report dated Dec. 14, 2016 in corresponding European application No. 14838584.2 (7 pages).

(Continued)

*Primary Examiner* — Kevin Bernatz
(74) *Attorney, Agent, or Firm* — K&L Gates LLP

(57) ABSTRACT

A magnetic recording medium includes: a substrate; and a magnetic layer including a ferrimagnetic particle powder. A product (V×SFD) of a particle volume V and a holding force distribution SFD of the ferrimagnetic particle is equal to or less than 2500 nm3.

11 Claims, 1 Drawing Sheet

(56) References Cited

U.S. PATENT DOCUMENTS

2012/0298908 A1* 11/2012 Ueyama ................ B82Y 30/00
                                                                         252/62.51 R

FOREIGN PATENT DOCUMENTS

| JP | S61-81608 A | 4/1986 |
| --- | --- | --- |
| JP | 62-291905 | 12/1987 |
| JP | 03-088307 | 4/1991 |
| JP | 07-282477 | 10/1995 |
| JP | 2007-294087 | 11/2007 |

OTHER PUBLICATIONS

International Search Report issued in PCT/JP2014/003784, dated Oct. 21, 2014 (2 pages).

* cited by examiner

FERRIMAGNETIC PARTICLE POWDER AND MANUFACTURING METHOD THEREFOR, AND MAGNETIC RECORDING MEDIUM AND MANUFACTURING METHOD THEREFOR

CROSS REFERENCES TO RELATED APPLICATIONS

The present application is a national stage of International Application No. PCT/JP2014/003784 filed on Jul. 17, 2014 and claims priority to Japanese Patent Application No. 2013-173869 filed on Aug. 23, 2013, the disclosure of which is incorporated herein by reference.

BACKGROUND

The present technology relates to a ferrimagnetic particle powder suitably used in a magnetic recording medium and a method of manufacturing the ferrimagnetic particle powder, as well as a magnetic recording medium including the ferrimagnetic particle powder and a method of manufacturing the magnetic recording medium.

A hexagonal ferrite particle powder is used as a magnetic powder in a perpendicular magnetic recording medium. As a method of manufacturing this hexagonal ferrite particle powder, there is known a so-called glass crystallization method in which a hexagonal ferrite-forming substance and a glass-forming substance are mixed and melted for amorphization, and the amorphized mixture is thereafter subjected to a heat treatment so that a hexagonal ferrite particle is precipitated in a glass matrix (for example, see Patent Literature 1).

CITATION LIST

Patent Literature

Patent Literature 1: JP S61-81608A

SUMMARY

Technical Problem

In recent years, the magnetic powder is desired to be decreased in size into a smaller (finer) particle in order to increase recording density. However, when the magnetic powder is decreased in size into a smaller particle, magnetic properties tend to decrease.

Therefore, an object of the present technology is to provide a ferrimagnetic particle powder capable of striking a balance between smaller particle sizes and magnetic properties, and a method of manufacturing the ferrimagnetic particle powder, as well as a magnetic recording medium and a method of manufacturing the magnetic recording medium.

Solution to Problem

In order to solve the above problem, according to a first technology, there is provided a magnetic recording medium including: a substrate; and a magnetic layer including a ferrimagnetic particle powder. A product (V×SFD) of a particle volume V and a holding force distribution SFD of the ferrimagnetic particle is equal to or less than 2500 nm³.

According to a second technology, there is provided a ferrimagnetic particle powder. A product (V×SFD) of a particle volume V and a holding force distribution SFD is equal to or less than 2500 nm³.

According to a third technology, there is provided a method of manufacturing a ferrimagnetic particle powder, including: melting a ferrimagnetic particle-forming substance and sodium borate to prepare a melt; rapidly cooling the melt to form an amorphous body; and performing a heat treatment to the amorphous body to obtain a ferrimagnetic particle. A temperature T [° C.] and a time t [h] of the heat treatment fall within a range defined by formulas (1) to (5) below:

$$T=550 \text{ [° C.]} \tag{1}$$

$$t=-aT+256/3 \text{ [h]} \tag{2}$$

(where, in formula (2), a=2/15 [h/° C.], and 550 [° C.]<T<580 [° C.])

$$t=8 \text{ [h] (where 580 [° C.]} \leq T \leq 650 \text{ [° C.])} \tag{3}$$

$$t=aT-236/3 \text{ [h]} \tag{4}$$

(where, in formula (4), a=2/15 [h/° C.], and 650 [° C.]<T<680 [° C.])

$$T=680 \text{ [° C.]} \tag{5}$$

According to a fourth technology, there is provided a method of manufacturing a magnetic recording medium, including: melting a ferrimagnetic particle-forming substance and sodium borate to prepare a melt; rapidly cooling the melt to form an amorphous body; performing a heat treatment to the amorphous body to obtain a ferrimagnetic particle powder; and forming, on a substrate, a magnetic layer containing the ferrimagnetic particle powder. A temperature T [° C.] and a time t [h] of the heat treatment fall within a range defined by formulas (1) to (5) below:

$$T=550 \text{ [° C.]} \tag{1}$$

$$t=-aT+256/3 \text{ [h]} \tag{2}$$

(where, in formula (2), a=2/15 [h/° C.], and 550 [° C.]<T<580 [° C.])

$$t=8 \text{ [h] (where 580 [° C.]} \leq T \leq 650 \text{ [° C.])} \tag{3}$$

$$t=aT-236/3 \text{ [h]} \tag{4}$$

(where, in formula (4), a=2/15 [h/° C.], and 650 [° C.]<T<680 [° C.])

$$T=680 \text{ [° C.]} \tag{5}$$

Advantageous Effects of Invention

As described above, according to the present technology, the ferrimagnetic particle powder can strike a balance between smaller particle sizes and magnetic properties.

Additional features and advantages are described herein, and will be apparent from the following Detailed Description and the figures.

DETAILED DESCRIPTION

Figure 1:
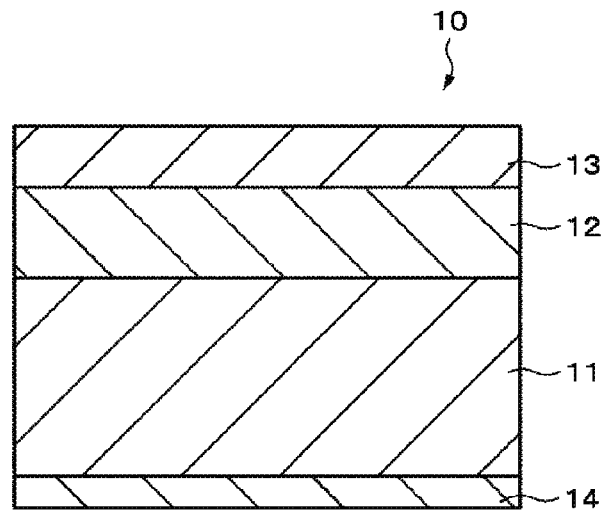
FIG. 1 is a schematic cross-sectional view illustrating an example of a structure of a magnetic recording medium according to the second embodiment of the present technology.

The present inventors have intensively conducted researches to achieve a balance between smaller particle sizes and magnetic properties of a ferrimagnetic particle powder. As a result, the present inventors have found that when a product (V×SFD) of a particle volume V and a holding force distribution (switching field distribution (SFD)) is defined to be equal to or less than 2500 nm$^3$, the ferrimagnetic particle powder can achieve a balance between smaller particle sizes and magnetic properties.

The present inventors have also intensively conducted researches on a method of manufacturing a ferrimagnetic particle powder in which a value of the above-described product (V×SFD) is equal to or less than 2500 nm$^3$. As a result, the present inventors have found that the particle size and magnetic properties of the ferrimagnetic particle powder can be controlled by selecting the temperature and time of a heat treatment performed to an amorphous body in the glass crystallization method. As a result of further intensive researches on the controlling method, the present inventors have found that when a temperature T [° C.] and a time t [h] of the heat treatment fall within the range defined by the following formulas (1) to (5), the value of the above-described product (V×SFD) comes to be equal to or less than 2500 nm$^3$.

$$T=550 \text{ [° C.]} \tag{1}$$

$$t=-aT+256/3 \text{ [h]} \tag{2}$$

(where, in formula (2), a=2/15 [h/° C.], and 550 [° C.]<T<580 [° C.])

$$t=8 \text{ [h] (where 580 [° C.]} \leq T \leq 650 \text{ [° C.])} \tag{3}$$

$$t=aT-236/3 \text{ [h]} \tag{4}$$

(where, in formula (4), a=2/15 [h/° C.], and 650 [° C.]<T<680 [° C.])

$$T=680 \text{ [° C.]} \tag{5}$$

Embodiments of the present technology will be described in the following order.
1 First embodiment
1.1 Structure of hexagonal ferrite particle powder
1.2 Method of manufacturing hexagonal ferrite particle powder
2 Second embodiment
2.1 Structure of magnetic recording medium
2.2 Method of manufacturing magnetic recording medium

1 First Embodiment

1.1 Structure of Hexagonal Ferrite Particle Powder

First, an example of the structure of the hexagonal ferrite particle powder according to the first embodiment of the present technology will be described. The hexagonal ferrite particle as an example of a ferrimagnetic particle contains Ba, and more specifically, barium ferrite, as a main component. Such a hexagonal ferrite particle may contain one or more elements selected from the group consisting of Al, Si, S, Sc, Ti, V, Cr, Cu, Y, Mo, Rh, Pd, Ag, Sn, Sb, Te, Ta, W, Re, Au, Hg, Pb, Bi, La, Ce, Pr, Nd, P, Co, Mn, Zn, Ni, Sr, B, Ge, and Nb, as well as Ba, Fe and O. More specifically, the hexagonal ferrite particle may contain, for example, one or more elements selected from the group consisting of Co, Zn and Ti. Examples of a combination of two or more elements include Co—Zn, Co—Ti, Co—Ti—Sn, Co—Zn—Ti, Co—Zn—Nb, Co—Ti—Zr, Co—Sn—Nb, Co—Ti—Zn, Co—Zn—Sn—Nb, Co—Zn—Zr—Nb, Co—Zn—Mn—Nb, Ni—Ti—Zn, Nb—Zn—Co, Sb—Zn—Co, Nb—Zn, and Zn—N. A portion of Fe contained in barium ferrite may be substituted by, for example, one or more elements described above.

The average particle size of the hexagonal ferrite particle powder is preferably equal to or less than 32 nm, and more preferably equal to or more than 15 nm and equal to or less than 32 nm. The average particle thickness of the hexagonal ferrite particle powder is preferably equal to or less than 9 nm, and more preferably equal to or more than 7 nm and equal to or less than 9 nm. The axial ratio of the hexagonal ferrite particle powder (average particle diameter/average particle thickness) is preferably equal to or less than 3.9, and more preferably equal to or more than 1.9 and equal to or less than 3.9.

The product (V×SFD) of the particle volume V and the holding force distribution (SFD) is equal to or less than 2500 nm$^3$, and preferably equal to or more than 400 nm$^3$ and equal to or less than 2500 nm$^3$. When the product (V×SFD) is equal to or less than 2500 nm$^3$, the hexagonal ferrite particle powder can achieve a balance between smaller particle sizes and magnetic properties.

The particle volume of the hexagonal ferrite particle is preferably equal to or less than 6000 nm$^3$, more preferably equal to or less than 5500 nm$^3$, and further preferably equal to or more than 1100 nm$^3$ and equal to or less than 5500 nm$^3$. The holding force distribution (SFD) is preferably equal to or less than 0.5. The activation volume Vact of the hexagonal ferrite particle is preferably equal to or less than 8000 nm$^3$, more preferably equal to or more than 1600 nm$^3$ and equal to or less than 8000 nm$^3$. In the hexagonal ferrite particle, it is preferred that the particle volume V is substantially equal to the activation volume Vact. More specifically, in the hexagonal ferrite particle, a ratio (Vact/V) of the activation volume Vact to the particle volume V is preferably equal to or less than 1.5, and more preferably equal to or more than 1.0 and equal to or less than 1.5.

1.2 Method of Manufacturing Hexagonal Ferrite Particle Powder

Next, an example of the method of manufacturing the hexagonal ferrite particle powder according to the first embodiment of the present technology will be described.
(Mixing and Melting of Raw Material)
First, a hexagonal ferrite-forming substance and a ferrite-forming substance are mixed to obtain a mixture. Next, the obtained mixture is melted to obtain a melt.

An example of the hexagonal ferrite-forming substance to be used includes iron oxide ($Fe_2O_3$) and barium carbonate ($BaCO_3$). As the hexagonal ferrite-forming substance, metal oxide other than iron oxide may further be used.

Examples of the metal oxide other than iron oxide include at least one selected from the group consisting of cobalt oxide (CoO), zinc oxide (ZnO), and titanium oxide ($TiO_2$). Barium oxide (BaO) may be used instead of barium carbonate, or barium oxide may further be used in addition to barium carbonate.

As the glass-forming substance, sodium borate is used. Such use of sodium borate enables the melting temperature of the mixture to be decreased in the subsequent process of melting the mixture. Furthermore, the use of sodium borate enables the hexagonal ferrite particle to be crystallized at low temperature in the subsequent process of heating an amorphous body. That is, the hexagonal ferrite particle powder can be reduced in size. Examples of sodium borate include $Na_2O.2B_2O_3$ ($Na_2BaO_7$), $2Na_2O.3B_2O_3$, $Na_2O.B_2O_3$, $Na_2O.3B_2O_3$, $Na_2O.4B_2O_3$, $Na_2O.5B_2O_3$, and $Na_2O.9B_2O_3$. One of these may be used alone, or two or more of these may be used in combination.

The ratio of the glass-forming substance to a total amount of the hexagonal ferrite-forming substance and the glass-forming substance is preferably more than 30 mol % and less than 50 mol %, and more preferably equal to or more than 35 mol % and equal to or less than 45 mol %. When the mixed amount of the glass-forming substance becomes equal to or less than 30 mol %, precipitation of a non-magnetic particle increases, causing manufacture of the hexagonal ferrite particle powder to become difficult. On the other hand, when the mixed amount of the glass-forming substance becomes equal to or more than 50 mol %, the amount of the glass-forming component excessively increases, causing precipitation of the hexagonal ferrite particle powder to become difficult.

(Amorphization of Melt)

Next, the obtained melt is quenched to obtain an amorphous body. Examples of a method for quenching the melt include, but not limited to, a method of placing the melt into water, and a method of pouring the melt onto a high-speed water-cooled roller for rolling and quenching the melt.

(Heat Treatment of Amorphous Body)

Next, the amorphous body is subjected to a heat treatment. Accordingly, the hexagonal ferrite particle is crystallized to be precipitated in an amorphous phase (glass phase). The temperature T [° C.] and the time t [h] of the heat treatment are within the range defined by the following formulas (1) to (5). When the temperature T [° C.] and the time t [h] of the heat treatment are within this range, the product (V×SFD) of the particle volume V and the holding force distribution (SFD) can be equal to or less than 2500 $nm^3$. That is, the hexagonal ferrite particle powder can achieve a balance between smaller particle size and magnetic properties.

$$T=550 \text{ [° C.]} \quad (1)$$

$$t=-aT+256/3 \text{ [h]} \quad (2)$$

(where, in formula (2), a=2/15 [h/° C.], and 550 [° C.]<T<580 [° C.])

$$t=8 \text{ [h] (where 580 [° C.]} \leq T \leq 650 \text{ [° C.])} \quad (3)$$

$$t=aT-236/3 \text{ [h]} \quad (4)$$

(where, in formula (4), a=2/15 [h/° C.], and 650 [° C.]<T<680 [° C.])

$$T=680 \text{ [° C.]} \quad (5)$$

From the viewpoint of suppressing reduction in productivity, the temperature T [° C.] and time t [h] of the heat treatment preferably fall within the range defined by the following formula (6), and more preferably by the following formula (7), in addition to the above-described formulas (1) to (5).

$$t=48 \text{ [h] (where 550 [° C.]} \leq T \leq 680 \text{ [° C.])} \quad (6)$$

$$t=24 \text{ [h] (where 550 [° C.]} \leq T \leq 680 \text{ [° C.])} \quad (7)$$

Thus, an intended hexagonal ferrite particle powder is obtained.

2 Second Embodiment 2.1 Structure of Magnetic Recording Medium

First, an example of the structure of a magnetic recording medium 10 according to the second embodiment of the present technology will be described with reference to FIG. 1. The magnetic recording medium 10 includes a substrate 11, a non-magnetic layer 12 and a magnetic layer 13. The non-magnetic layer 12 and the magnetic layer 13 are laminated on one surface of the substrate 11 in this order. The magnetic recording medium 10 may further include a back coat layer 14 on the other surface of the substrate 11 as necessary.

(Substrate)

The substrate body 11 which serves as a support is, for example, a long film. As the substrate body 11, a non-magnetic substrate body having flexibility is preferably used. An example of the material of the non-magnetic substrate body to be used may include a flexible polymer resin material used in a common magnetic recording medium. Specific examples of such a polymer resin material include polyesters, polyolefins, cellulose derivatives, vinyl-based resins, polyimides, polyamides or polycarbonate.

(Magnetic Layer)

The magnetic layer 13 contains the hexagonal ferrite magnetic powder and a binding agent (binder). As the hexagonal ferrite magnetic powder, the above-described hexagonal ferrite magnetic powder according to the first embodiment is used. Examples of the binding agent include polyurethane resins, polyester-based resins, polyamide-based resins, vinyl chloride-based resins, acrylic resins obtained by copolymerizing styrene, acrylonitrile, methyl methacrylate, and the like, cellulose-based resins such as nitrocellulose, epoxy resins, phenoxy resins, and polyvinyl alkylal resins such as polyvinyl acetal and polyvinyl butyral. One of these may be used alone, or two or more of these may be used in combination. Among these, polyurethane resins, acrylic resins, cellulose-based resins, and vinyl chloride-based resins are preferred.

The binding agent preferably has a functional group (polar group) that adsorbs to the surface of the hexagonal ferrite magnetic powder, from the viewpoint of obtaining further excellent dispersibility and durability. Examples of such a functional group include —COOM, —$SO_3$M, —$OSO_3$M, —PO(OM)$_2$, —OPO(OM)$_2$ (where M represents a hydrogen atom or an alkali metal salt group), —OH, $NR_2$, —$NR_3$ (where R is a hydrocarbon group), an epoxy group, —SH, and —CN. At least one selected from these functional groups may be introduced to the binding agent by, for example, a copolymerization or addition reaction.

The magnetic layer 13 may further include an additive as necessary. As the additive, at least one or more selected from an abrasive, a lubricant, a disperser, a dispersion aid, a fungicide, an antistatic agent, an antioxidant, a solvent, carbon black, and the like may be used.

(Non-Magnetic Layer)

The non-magnetic layer 12 contains, for example, a non-magnetic powder and a bonding agent. The non-magnetic powder may be either an inorganic material or an organic material. Carbon black or the like may be also used. Examples of the inorganic material include metal, metal oxide, metal carbonate, metal sulfate, metal nitride, metal carbide, and metal sulfide.

Specific examples of the non-magnetic powder include titanium oxide such as titanium dioxide, cerium oxide, tin oxide, tungsten oxide, ZnO, $ZrO_2$, $SiO_2$, $Cr_2O_3$, α-alumina, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide. One of these may be used alone, or two or more of these may be used in combination. The shape of the non-magnetic powder may be acicular, spherical, polyhedral, or tabular. The binding agent is the same as the binding agent contained in the magnetic layer 12.

The magnetic layer 13 may further include an additive as necessary. The additive is the same as the additive contained in the magnetic layer 12.

2.2 Method of Manufacturing Magnetic Recording Medium

Next, an example of the method of manufacturing the magnetic recording medium 10 according to the second embodiment of the present technology will be described.

(Preparation of Paint)

First, a non-magnetic powder and a binding agent are kneaded and dispersed in a solvent, thereby to prepare a paint for forming a non-magnetic layer. Next, the hexagonal ferrite magnetic powder and the binding agent according to the first embodiment are kneaded and dispersed in a solvent, thereby to prepare a paint for forming a magnetic layer. A similar solvent, dispersing apparatus, and kneading apparatus are used when preparing the paint for forming a magnetic layer and the paint for forming a non-magnetic layer.

Examples of the solvent used for preparing the above-described paints include ketone-based solvents such as acetone, methyl ethyl ketone, methyl isobutyl ketone and cyclohexanone, alcohol-based solvents such as methanol, ethanol and propanol, ester-based solvents such as methyl acetate, ethyl acetate, butyl acetate, propyl acetate, ethyl lactate and ethylene glycol acetate, ether-based solvents such as diethylene glycol dimethyl ether, 2-ethoxy ethanol, tetrahydrofuran and dioxane, aromatic hydrocarbon-based solvents such as benzene, toluene and xylene, and halogenated hydrocarbon-based solvents such as methylene chloride, ethylene chloride, carbon tetrachloride, chloroform and chlorobenzene. One of these may be used alone, or a mixture of two or more of these may be appropriately used.

Examples of the kneading apparatus to be used for preparing the above-described paints include, but not particularly limited to, conventionally known kneading apparatuses such as a continuous biaxial kneading device, a continuous biaxial kneading device usable for serial dilution, a kneader, a pressure kneader, and a roll kneader. Examples of the dispersing apparatus used for preparing the above-described paints include, but not particularly limited to, conventionally known dispersing apparatuses such as a roll mill, a ball mill, a horizontal sand mill, a vertical sand mill, a spike mill, a pin mill, a tower mill, a DCP mill, a homogenizer, and an ultrasonic disperser.

(Formation of Non-Magnetic Layer and Magnetic Layer)

Next, the prepared paint for forming a non-magnetic layer is applied on one surface of the substrate 11, and dried. Accordingly, the non-magnetic layer 12 is formed on the surface of the substrate 11. Next, the prepared paint for forming a non-magnetic layer is applied on the surface of the non-magnetic layer 12, and dried. Accordingly, the magnetic layer 13 is formed on the surface of the non-magnetic layer 12. Next, the back coat layer 14 may be formed on the other surface of the substrate 11 as necessary. Next, the substrate 11, on which the non-magnetic layer 11 and the magnetic layer 12 are formed, is subjected to a calender treatment, and thereafter is cut at a predetermined width. The back coat layer 14 may be formed after the calender treatment has been performed. Thus, an intended magnetic recording medium 10 is obtained.

EXAMPLES

Although the present technology will be specifically described by way of examples below, the present technology is not limited to only these examples.

Examples 1-1 and 1-2, Comparative Examples 1 to 1 and 1-2

First, there were mixed $BaCO_3$: 22 mol %, $Fe_2O_3$: 32.2 mol %, CoO: 1.45 mol %, ZnO: 1.45 mol % and $TiO_2$: 2.9 mol % as a hexagonal ferrite-forming substance, and $Na_2B_4O_7$: 40 mol % as a glass-forming substance. The obtained mixture was melted in an alumina crucible at 1200° C. for 15 minutes, thereby to obtain a melt. Next, this melt was placed in water to obtain an amorphous body. Subsequently, this amorphous body was subjected to a heat treatment at 550° C. for 4 to 24 hours. Thereafter, a glass content was removed with heated weak acid (20% acetic acid, 80° C.), and the residue was washed with water. Thus, an intended particle powder was obtained.

Examples 2-1 and 2-2, Comparative Example 2-1

A particle powder was obtained in a similar manner to Example 1-2 and Comparative Examples 1 to 1 and 1-2, except that the temperature during the heat treatment was changed to 580° C.

Examples 3-1 and 3-2, Comparative Example 2-1

A particle powder was obtained in a similar manner to Example 1-2 and Comparative Examples 1 to 1 and 1-2, except that the temperature during the heat treatment was changed to 600° C.

Examples 4-1 and 4-2, Comparative Example 4-1

A particle powder was obtained in a similar manner to Example 1-2 and Comparative Examples 1 to 1 and 1-2, except that the temperature during the heat treatment was changed to 650° C.

Examples 5-1 and 5-2, Comparative Examples 5-1 and 5-2

A particle powder was obtained in a similar manner to Examples 1-1 and 1-2 and Comparative Examples 1 to 1 and 1-2, except that the temperature during the heat treatment was changed to 680° C.

Comparative Examples 6-1 to 6-3

A particle powder was obtained in a similar manner to Example 1-1 and Comparative Examples 1 to 1 and 1-2, except that the temperature during the heat treatment was changed to 700° C., and the time during the heat treatment was changed to 1 to 8 hours.

Comparative Examples 7-1 to 7-3

A particle powder was obtained in a similar manner to Example 1-1 and Comparative Examples 1 to 1 and 1-2, except that the temperature during the heat treatment was changed to 750° C., and the time during the heat treatment was changed to 1 to 8 hours.

Example 8-1

A particle powder was obtained in a similar manner to Example 1-1, except that the mixed amount of CoO as a hexagonal ferrite-forming substance was changed to 2.9 mol %, and the mixed amount of ZnO was changed to 0 mol %.

Example 8-2

A particle powder was obtained in a similar manner to Example 1-1, except that the mixed amount of CoO as a hexagonal ferrite-forming substance was changed to 0 mol %, and the mixed amount of ZnO was changed to 2.9 mol %.

Example 9-1

A particle powder was obtained in a similar manner to Example 1-1, except that the mixed amounts of raw materials as a hexagonal ferrite-forming substance were changed to $BaCO_3$: 22 mol %, $Fe_2O_3$: 35.4 mol %, CoO: 0.65 mol %, ZnO: 0.65 mol %, and $TiO_2$: 1 1.3 mol %.

Example 9-2

A particle powder was obtained in a similar manner to Example 9-1, except that the mixed amount of CoO as a hexagonal ferrite-forming substance was changed to 1.3 mol %, and the mixed amount of ZnO was changed to 0 mol %.

Example 9-3

A particle powder was obtained in a similar manner to Example 9-1, except that the mixed amount of CoO as a hexagonal ferrite-forming substance was changed to 0 mol %, and the mixed amount of ZnO was changed to 1.3 mol %.

Comparative Examples 10-1 and 10-2

First, there were mixed $BaCO_3$: 27 mol %, $Fe_2O_3$: 19.4 mol %, CoO: 0.9 mol %, ZnO: 0.9 mol % and $TiO_2$: 1.8 mol % as a hexagonal ferrite-forming substance, and $Na_2B_4O_7$: 50 mol % as a glass-forming substance. The obtained mixture was melted in an alumina crucible at 1200° C. for 15 minutes, thereby to obtain a melt. Next, this melt was placed in water to obtain an amorphous body. Subsequently, this amorphous body was subjected to a heat treatment at 600° C. for 8 to 24 hours. Thereafter, a glass content was removed with heated weak acid (20% acetic acid, 80° C.), and the residue was washed with water. Thus, an intended particle powder was obtained.

Examples 11-1 and 11-2

The mixed amounts of raw materials as a hexagonal ferrite-forming substance were changed to $BaCO_3$: 24 mol %, $Fe_2O_3$: 26.2 mol %, CoO: 1.2 mol %, ZnO: 1.2 mol %, and $TiO_2$: 2.4 mol %. Furthermore, the mixed amount of $Na_2B_4O_7$ as a glass-forming substance was changed to $Na_2B_4O_7$: 45 mol %. Otherwise, a particle powder was obtained in a similar manner to Comparative Examples 10-1 and 10-2.

Examples 12-1 and 12-2

The mixed amounts of raw materials as a hexagonal ferrite-forming substance were changed to $BaCO_3$: 19 mol %, $Fe_2O_3$: 38.9 mol %, CoO: 1.8 mol %, ZnO: 1.8 mol %, and $TiO_2$: 3.6 mol %. Furthermore, the mixed amount of $Na_2B_4O_7$ as a glass-forming substance was changed to $Na_2B_4O_7$: 35 mol %. Otherwise, a particle powder was obtained in a similar manner to Comparative Examples 10-1 and 10-2.

Comparative Examples 13-1 and 13-2

The mixed amounts of raw materials as a hexagonal ferrite-forming substance were changed to $BaCO_3$: 16 mol %, $Fe_2O_3$: 45.6 mol %, CoO: 2.1 mol %, ZnO: 2.1 mol %, and $TiO_2$: 4.2 mol %. Furthermore, the mixed amount of $Na_2B_4O_7$ as a glass-forming substance was changed to $Na_2B_4O_7$: 30 mol %. Otherwise, a particle powder was obtained in a similar manner to Comparative Examples 10-1 and 10-2.

(Evaluation)

The particle powders according to the above-described examples and comparative examples were evaluated as below.

(Crystal Structure)

The particle powders were observed by X-ray diffraction. As a result, peaks of hexagonal ferrite were observed.

(Composition)

The compositions of the particle powders were analyzed by fluorescence X-ray analysis. The result of the analysis was represented by the following composition formula.

$$BaFe_{(12-2\delta)}Zn_{\delta/2}Co_{\delta/2}Ti_{\delta}O_{19}$$

It is noted that ratios $\delta/2$, $\delta/2$ and $\delta$ of Co, Zn and Ti in the above-described composition formula were indicated in Table 1, Table 3, and Table 5.

(Average Particle Size, Average Particle Thickness, and Axial Ratio)

First, each of the particle powders was photographed with a transmission electron microscope (TEM). Next, 500 particles were randomly selected from the photographed TEM picture, and each of the selected particles was measured for particle size and particle thickness. Here, the particle size means the largest diameter length of a particle (that is, the largest particle size). The particle thickness means the largest thickness of a particle. Next, averages (arithmetic averages) in particle size and particle thickness of the measured 500 particles were simply calculated to obtain an average particle size R and an average particle thickness D. Then, an axial ratio (R/D) was calculated based on the calculated average particle size R and average particle thickness D.

(Particle Volume)

The particle volume (average particle volume) V was calculated using the average particle size R calculated in the above-described evaluation method for the average particle size, according to the following formula, based on an assumption that the particle has a shape of a hexagonal cylinder.

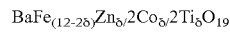

$V=(3\sqrt{3}/8)R^2$ [$nm^3$]

Here, "$\sqrt{3}$" indicates a square root of 3.

(Saturation Magnetization, Coercivity, and SFD)

First, an M-H loop of the particle powder was obtained using a vibrating sample magnetometer (VSM). Next, a saturation magnetization σS, a coercivity Hc, and an SFD value were calculated from the obtained M-H loop.

(Activation Volume)

First, there was prepared a magnetic recording medium containing each of the particle powders according to the above-described examples and comparative examples in the magnetic layer. Next, an activation volume Vact was calculated in the following procedures (a) to (c).

(a) First, a residual magnetization curve (DCD) was measured in the following manner. The saturation magnetic field was defined to be 15 kOe. Next, from the obtained DCD curve, a residual coercive force Hr, and a tilt (irreversible magnetic susceptibility) χirr of the DED curve at the Hr were calculated.

(b) Next, the time dependency of magnetization was measured in the following manner. First, a magnetic field of 15 kOe was applied in the negative direction to saturate a medium. Thereafter, a magnetic field equal to Hr was applied in the opposite direction, and the magnetic field was fixed. While fixing the magnetic field for 10 to 1000 seconds, the amount of change in magnetization was measured. Next, a time decay S of magnetization was calculated from the obtained data, according to the following formula.

$$M(t) = M0 + S \ln(t)$$

(S: Magnetic viscosity coefficient)

(c) Next, χirr and S obtained in (a) and (b) were substituted in the following formula to calculate Vact.

$$Vact = k_B T \chi irr / (\mu_0 MsS)$$

where $k_B$: Boltzmann constant ($1.38 \times 10^{-23}$ [J/K]), $\mu_0$: magnetic permeability of vacuum ($4\pi \times 10^{-7}$ [H/M]), and Ms: saturation magnetization amount of medium (emu/cc).

(Snr)

First, there was prepared a magnetic recording medium containing each of the particle powders according to the above-described examples and comparative examples in the magnetic layer. Next, the magnetic recording medium measured by a so-called drag tester in which a ring-type recording head and a giant magnetoresistive (GMR)-type reproducing head are subjected to reciprocating vibration by a piezo stage for performing recording and reproduction. Here, the read track width of the reproducing head was 120 nm. Next, under a recording wavelength of 250 kilo flux changes per inch (kFCI), an SNR was obtained by calculating a ratio between the peak-to-peak voltage of a reproducing wavelength and the voltage calculated from a value obtained by integrating a noise spectrum in a band range of 0 kFCI to 500 kFCI. Then, the obtained SNR was evaluated into three levels based on the following criteria. The result of the evaluation was indicated in Table 1. It is noted that "Poor", "Good", and "Excellent" in Table 1 correspond to the following criteria.

Poor: SNR is less than 20 dB.

Good: SNR is equal to or more than 20 dB and less than 23 dB.

Excellent: SNB is equal to or more than 23 dB.

Table 1 indicates raw materials and compositions of particle powders of Examples 1-1 to 5-2 and Comparative Examples 1-1 to 7-3.

TABLE 1

| | Glass-forming substance | Hexagonal ferrite-forming substance | | | | | Composition of hexagonal ferrite | | | Heat treatment (crystallization) | |
|---|---|---|---|---|---|---|---|---|---|---|---|
| | $Na_2B_4O_7$ [mol %] | $BaCO_3$ [mol %] | $Fe_2O_3$ [mol %] | CoO [mol %] | ZnO [mol %] | $TiO_2$ [mol %] | Co (δ/2) | Zn (δ/2) | Ti (δ) | Temperature [° C.] | Time [h] |
| Comparative Example 1-1 | 40 | 22 | 32.2 | 1.45 | 1.45 | 2.9 | 0.23 | 0.23 | 0.465 | 550 | 4 |
| Comparative Example 1-2 | 40 | 22 | 32.2 | 1.45 | 1.45 | 2.9 | 0.23 | 0.23 | 0.465 | 550 | 8 |
| Example 1-1 | 40 | 22 | 32.2 | 1.45 | 1.45 | 2.9 | 0.23 | 0.23 | 0.465 | 550 | 12 |
| Example 1-2 | 40 | 22 | 32.2 | 1.45 | 1.45 | 2.9 | 0.23 | 0.23 | 0.465 | 550 | 24 |
| Comparative Example 2-1 | 40 | 22 | 32.2 | 1.45 | 1.45 | 2.9 | 0.23 | 0.23 | 0.465 | 580 | 4 |
| Example 2-1 | 40 | 22 | 32.2 | 1.45 | 1.45 | 2.9 | 0.23 | 0.23 | 0.465 | 580 | 8 |
| Example 2-2 | 40 | 22 | 32.2 | 1.45 | 1.45 | 2.9 | 0.23 | 0.23 | 0.465 | 580 | 24 |
| Comparative Example 3-1 | 40 | 22 | 32.2 | 1.45 | 1.45 | 2.9 | 0.23 | 0.23 | 0.465 | 600 | 4 |
| Example 3-1 | 40 | 22 | 32.2 | 1.45 | 1.45 | 2.9 | 0.23 | 0.23 | 0.465 | 600 | 8 |
| Example 3-2 | 40 | 22 | 32.2 | 1.45 | 1.45 | 2.9 | 0.23 | 0.23 | 0.465 | 600 | 24 |
| Comparative Example 4-1 | 40 | 22 | 32.2 | 1.45 | 1.45 | 2.9 | 0.23 | 0.23 | 0.465 | 650 | 4 |
| Example 4-1 | 40 | 22 | 32.2 | 1.45 | 1.45 | 2.9 | 0.23 | 0.23 | 0.465 | 650 | 8 |
| Example 4-2 | 40 | 22 | 32.2 | 1.45 | 1.45 | 2.9 | 0.23 | 0.23 | 0.465 | 650 | 24 |
| Comparative Example 5-1 | 40 | 22 | 32.2 | 1.45 | 1.45 | 2.9 | 0.23 | 0.23 | 0.465 | 680 | 4 |
| Comparative Example 5-2 | 40 | 22 | 32.2 | 1.45 | 1.45 | 2.9 | 0.23 | 0.23 | 0.465 | 680 | 8 |
| Example 5-1 | 40 | 22 | 32.2 | 1.45 | 1.45 | 2.9 | 0.23 | 0.23 | 0.465 | 680 | 12 |
| Example 5-2 | 40 | 22 | 32.2 | 1.45 | 1.45 | 2.9 | 0.23 | 0.23 | 0.465 | 680 | 24 |
| Comparative Example 6-1 | 40 | 22 | 32.2 | 1.45 | 1.45 | 2.9 | 0.23 | 0.23 | 0.465 | 700 | 1 |
| Comparative Example 6-2 | 40 | 22 | 32.2 | 1.45 | 1.45 | 2.9 | 0.23 | 0.23 | 0.465 | 700 | 4 |
| Comparative Example 6-3 | 40 | 22 | 32.2 | 1.45 | 1.45 | 2.9 | 0.23 | 0.23 | 0.465 | 700 | 8 |
| Comparative Example 7-1 | 40 | 22 | 32.2 | 1.45 | 1.45 | 2.9 | 0.23 | 0.23 | 0.465 | 750 | 1 |

TABLE 1-continued

| | Glass-forming substance | Hexagonal ferrite-forming substance | | | | | Composition of hexagonal ferrite | | | Heat treatment (crystallization) | |
|---|---|---|---|---|---|---|---|---|---|---|---|
| | $Na_2B_4O_7$ [mol %] | $BaCO_3$ [mol %] | $Fe_2O_3$ [mol %] | CoO [mol %] | ZnO [mol %] | $TiO_2$ [mol %] | Co ($\delta$/2) | Zn ($\delta$/2) | Ti ($\delta$) | Temperature [° C.] | Time [h] |
| Comparative Example 7-2 | 40 | 22 | 32.2 | 1.45 | 1.45 | 2.9 | 0.23 | 0.23 | 0.465 | 750 | 4 |
| Comparative Example 7-3 | 40 | 22 | 32.2 | 1.45 | 1.45 | 2.9 | 0.23 | 0.23 | 0.465 | 750 | 8 |

Table 2 indicates evaluation results of particle powders of Examples 1-1 to 5-2 and Comparative Examples 1-1 to 7-3.

TABLE 2

| | Hexagonal ferrite particle | | | | | | | | | | |
|---|---|---|---|---|---|---|---|---|---|---|---|
| | Average particle size R [nm] | Average particle thickness D [nm] | Axial ratio (R/D) | Particle volume V [$nm^3$] | $\sigma s$ [emu/g] | Hc [Oe] | SFD | V × SFD [$nm^3$] | Vact/V | Vact [$nm^3$] | SNR |
| Comparative Example 1-1 | 15 | 8 | 1.9 | 1169 | Difficult to measure | Difficult to measure | Difficult to measure | — | — | — | — |
| Comparative Example 1-2 | 15 | 8 | 1.9 | 1169 | Difficult to measure | Difficult to measure | Difficult to measure | — | — | — | — |
| Example 1-1 | 15 | 8 | 1.9 | 1169 | 51 | 2900 | 0.4 | 468 | 1.5 | 1800 | Excellent |
| Example 1-2 | 15 | 8 | 1.9 | 1169 | 52 | 3000 | 0.4 | 468 | 1.5 | 1800 | Excellent |
| Comparative Example 2-1 | 17 | 8 | 2.1 | 1502 | Difficult to measure | Difficult to measure | Difficult to measure | — | — | — | — |
| Example 2-1 | 17 | 8 | 2.1 | 1502 | 49 | 2800 | 0.5 | 751 | 1.5 | 2200 | Excellent |
| Example 2-2 | 17 | 8 | 2.1 | 1502 | 53 | 3000 | 0.3 | 451 | 1.1 | 1600 | Excellent |
| Comparative Example 3-1 | 20 | 8 | 2.5 | 2078 | Difficult to measure | Difficult to measure | Difficult to measure | — | — | — | — |
| Example 3-1 | 20 | 8 | 2.5 | 2078 | 50 | 2800 | 0.5 | 1039 | 1.5 | 3100 | Excellent |
| Example 3-2 | 20 | 8 | 2.5 | 2078 | 54 | 3000 | 0.3 | 624 | 1.0 | 2100 | Excellent |
| Comparative Example 4-1 | 30 | 9 | 3.3 | 5261 | 52 | 2900 | 0.5 | 2631 | 2.1 | 11000 | Poor |
| Example 4-1 | 30 | 9 | 3.3 | 5261 | 54 | 3000 | 0.4 | 2104 | 1.5 | 8000 | Good |
| Example 4-2 | 30 | 9 | 3.3 | 5261 | 56 | 3100 | 0.3 | 1578 | 1.0 | 5000 | Good |
| Comparative Example 5-1 | 32 | 9 | 3.6 | 5986 | 53 | 2900 | 0.6 | 3592 | 2.2 | 13000 | Poor |
| Comparative Example 5-2 | 32 | 9 | 3.6 | 5986 | 54 | 3000 | 0.5 | 2993 | 1.8 | 11000 | Poor |
| Example 5-1 | 32 | 9 | 3.6 | 5986 | 54 | 3100 | 0.4 | 2394 | 1.3 | 8000 | Good |
| Example 5-2 | 32 | 9 | 3.6 | 5986 | 55 | 3100 | 0.4 | 2394 | 1.2 | 7000 | Good |
| Comparative Example 6-1 | 30 | 8 | 3.8 | 4677 | 54 | 3000 | 0.7 | 3274 | 3.8 | 18000 | Poor |
| Comparative Example 6-2 | 40 | 9 | 4.4 | 9353 | 55 | 3100 | 0.6 | 5612 | 2.1 | 20000 | Poor |
| Comparative Example 6-3 | 50 | 9 | 5.6 | 14614 | 56 | 3200 | 0.5 | 7307 | 1.1 | 16000 | Poor |
| Comparative Example 7-1 | 40 | 8 | 5.0 | 8314 | 55 | 3000 | 0.8 | 6651 | 4.0 | 33000 | Poor |
| Comparative Example 7-2 | 50 | 9 | 5.6 | 14614 | 56 | 3100 | 0.7 | 10230 | 2.0 | 29000 | Poor |
| Comparative Example 7-3 | 70 | 10 | 7.0 | 31826 | 57 | 3200 | 0.5 | 15913 | 1.0 | 32000 | Poor |

Table 3 indicates raw materials and compositions of particle powders of Examples 8-1 to 9-3.

TABLE 3

| | Glass-forming substance | Hexagonal ferrite-forming substance | | | | | Composition of hexagonal ferrite | | | Heat treatment (crystallization) | |
|---|---|---|---|---|---|---|---|---|---|---|---|
| | $Na_2B_4O_7$ [mol %] | $BaCO_3$ [mol %] | $Fe_2O_3$ [mol %] | CoO [mol %] | ZnO [mol %] | $TiO_2$ [mol %] | Co ($\delta$/2) | Zn ($\delta$/2) | Ti ($\delta$) | Temperature [° C.] | Time [h] |
| Example 8-1 | 40 | 22 | 32.2 | 2.9 | 0 | 2.9 | 0.465 | 0 | 0.465 | 600 | 24 |
| Example 8-2 | 40 | 22 | 32.2 | 0 | 2.9 | 2.9 | 0 | 0.465 | 0.465 | 600 | 24 |
| Example 9-1 | 40 | 22 | 35.4 | 0.65 | 0.65 | 1.3 | 0.1 | 0.1 | 0.2 | 600 | 24 |

TABLE 3-continued

|  | Glass-forming substance | Hexagonal ferrite-forming substance | | | | | Composition of hexagonal ferrite | | | Heat treatment (crystallization) | |
|---|---|---|---|---|---|---|---|---|---|---|---|
|  | Na$_2$B$_4$O$_7$ [mol %] | BaCO$_3$ [mol %] | Fe$_2$O$_3$ [mol %] | CoO [mol %] | ZnO [mol %] | TiO$_2$ [mol %] | Co (δ/2) | Zn (δ/2) | Ti (δ) | Temperature [° C.] | Time [h] |
| Example 9-2 | 40 | 22 | 35.4 | 1.3 | 0 | 1.3 | 0.2 | 0 | 0.2 | 600 | 24 |
| Example 9-3 | 40 | 22 | 35.4 | 0 | 1.3 | 1.3 | 0 | 0.2 | 0.2 | 600 | 24 |

Table 4 indicates evaluation results of particle powders of Examples 8-1 to 9-3.

TABLE 4

|  | Hexagonal ferrite particle | | | | | | | | | |
|---|---|---|---|---|---|---|---|---|---|---|
|  | Average particle size R [nm] | Average particle thickness D [nm] | Axial ratio (R/D) | Particle volume V [nm$^3$] | σs [emu/g] | Hc [Oe] | SFD | V × SFD [nm$^3$] | Vact/V | Vact [nm$^3$] SNR |
| Example 8-1 | 20 | 8 | 2.5 | 2078 | 48 | 2800 | 0.3 | 624 | 1.0 | 2100 Excellent |
| Example 8-2 | 22 | 7 | 3.1 | 2201 | 58 | 3000 | 0.3 | 660 | 1.0 | 2200 Excellent |
| Example 9-1 | 25 | 8 | 3.1 | 3248 | 58 | 3000 | 0.3 | 974 | 1.0 | 3200 Excellent |
| Example 9-2 | 25 | 8 | 3.1 | 3248 | 50 | 2800 | 0.3 | 974 | 1.0 | 3200 Excellent |
| Example 9-3 | 27 | 7 | 3.9 | 3314 | 60 | 3000 | 0.3 | 994 | 1.0 | 3300 Excellent |

Table 5 indicates raw materials and compositions of particle powders of Examples 3-1, 3-2, and 11-1 to 12-2 and Comparative Examples 10-1 to 13-2.

TABLE 5

|  | Glass-forming substance | Hexagonal ferrite-forming substance | | | | | Composition of hexagonal ferrite | | | Heat treatment (crystallization) | |
|---|---|---|---|---|---|---|---|---|---|---|---|
|  | Na$_2$B$_4$O$_7$ [mol %] | BaCO$_3$ [mol %] | Fe$_2$O$_3$ [mol %] | CoO [mol %] | ZnO [mol %] | TiO$_2$ [mol %] | Co (δ/2) | Zn (δ/2) | Ti (δ) | Temperature [° C.] | Time [h] |
| Comparative Example 10-1 | 50 | 27 | 19.4 | 0.9 | 0.9 | 1.8 | 0.23 | 0.23 | 0.465 | 600 | 8 |
| Comparative Example 10-2 | 50 | 27 | 19.4 | 0.9 | 0.9 | 1.8 | 0.23 | 0.23 | 0.465 | 600 | 24 |
| Example 11-1 | 45 | 24 | 26.2 | 1.2 | 1.2 | 2.4 | 0.23 | 0.23 | 0.465 | 600 | 8 |
| Example 11-2 | 45 | 24 | 26.2 | 1.2 | 1.2 | 2.4 | 0.23 | 0.23 | 0.465 | 600 | 24 |
| Example 3-1 | 40 | 22 | 32.2 | 1.45 | 1.45 | 2.9 | 0.23 | 0.23 | 0.465 | 600 | 8 |
| Example 3-2 | 40 | 22 | 32.2 | 1.45 | 1.45 | 2.9 | 0.23 | 0.23 | 0.465 | 600 | 24 |
| Example 12-1 | 35 | 19 | 38.9 | 1.8 | 1.8 | 3.6 | 0.23 | 0.23 | 0.465 | 600 | 8 |
| Example 12-2 | 35 | 19 | 38.9 | 1.8 | 1.8 | 3.6 | 0.23 | 0.23 | 0.465 | 600 | 24 |
| Comparative Example 13-1 | 30 | 16 | 45.6 | 2.1 | 2.1 | 4.2 | 0.23 | 0.23 | 0.465 | 600 | 8 |
| Comparative Example 13-2 | 30 | 16 | 45.6 | 2.1 | 2.1 | 4.2 | 0.23 | 0.23 | 0.465 | 600 | 24 |

Table 6 indicates evaluation results of particle powders of Examples 3-1, 3-2, and 11-1 to 12-2 and Comparative Examples 10-1 to 13-2.

TABLE 6

|  | Hexagonal ferrite particle | | | | | | | | | |
|---|---|---|---|---|---|---|---|---|---|---|
|  | Average particle size R [nm] | Average particle thickness D [nm] | Axial ratio (R/D) | Particle volume V [nm$^3$] | σs [emu/g] | Hc [Oe] | SFD | V × SFD [nm$^3$] | Vact/V | Vact [nm$^3$] SNR |
| Comparative Example 10-1 | Difficult to prepare hexagonal ferrite particle (only glass) | | — | — | — | — | — | — | — | — — |
| Comparative Example 10-2 | Difficult to prepare hexagonal ferrite particle (only glass) | | — | — | — | — | — | — | — | — — |
| Example 11-1 | 18 | 9 | 2.0 | 1894 | 49 | 2800 | 0.5 | 947 | 1.5 | 2800 Excellent |

TABLE 6-continued

| | Hexagonal ferrite particle | | | | | | | | | | |
|---|---|---|---|---|---|---|---|---|---|---|---|
| | Average particle size R [nm] | Average particle thickness D [nm] | Axial ratio (R/D) | Particle volume V [nm³] | σs [emu/g] | Hc [Oe] | SFD | V × SFD [nm³] | Vact/V | Vact [nm³] | SNR |
| Example 11-2 | 18 | 9 | 2.0 | 1894 | 52 | 2900 | 0.4 | 758 | 1.0 | 1900 | Excellent |
| Example 3-1 | 20 | 8 | 2.5 | 2078 | 50 | 2800 | 0.5 | 1039 | 1.5 | 3100 | Excellent |
| Example 3-2 | 20 | 8 | 2.5 | 2078 | 54 | 3000 | 0.3 | 624 | 1.0 | 2100 | Excellent |
| Example 12-1 | 22 | 7 | 3.1 | 2201 | 51 | 2900 | 0.4 | 880 | 1.5 | 3200 | Excellent |
| Example 12-2 | 22 | 7 | 3.1 | 2201 | 55 | 3100 | 0.3 | 660 | 1.0 | 2200 | Excellent |
| Comparative Example 13-1 | Difficult to prepare hexagonal ferrite particle (non-magnetic particle increases) | | | — | — | — | — | — | — | — | — |
| Comparative Example 13-2 | Difficult to prepare hexagonal ferrite particle (non-magnetic particle increases) | | | — | — | — | — | — | — | — | — |

The following can be understood from Table 1 and Table 2.

In Examples 1-1 to 5-1, the product (V×SFD) of the particle volume V and the holding force distribution SFD of the hexagonal ferrite particle is equal to or less than 2500 nm³, exhibiting good magnetic properties. Accordingly, the SNR is good.

On the other hand, in Comparative Examples 1-1 to 7-3, the above-described product (V×SFD) exceeds 2500 nm³, failing to exhibit good magnetic properties. Accordingly, the SNR is deteriorated.

From the viewpoint of obtaining good magnetic properties (that is, V×SFD 2500 nm³), the temperature T and the time t of the heat treatment preferably satisfy one of the following formulas (i) to (iii).

$$550\ [°\ C.] \le T < 580\ [°\ C.],\ 24\ [h] \le t \quad (i)$$

$$580\ [°\ C.] \le T \le 650\ [°\ C.],\ 8\ [h] \le t \quad (ii)$$

$$650\ [°\ C.] < T \le 680\ [°\ C.],\ 24\ [h] \le t \quad (iii)$$

From the viewpoint of productivity, the time of the heat treatment is preferably t≤48 [h].

When the temperature and the time of the heat treatment fall within the above-described range, there can be obtained a tape in which the activation volume Vact is small, and magnetic properties are good.

It is preferred that the particle volume V and the activation volume Vact are approximately equal to each other.

Figure 2:
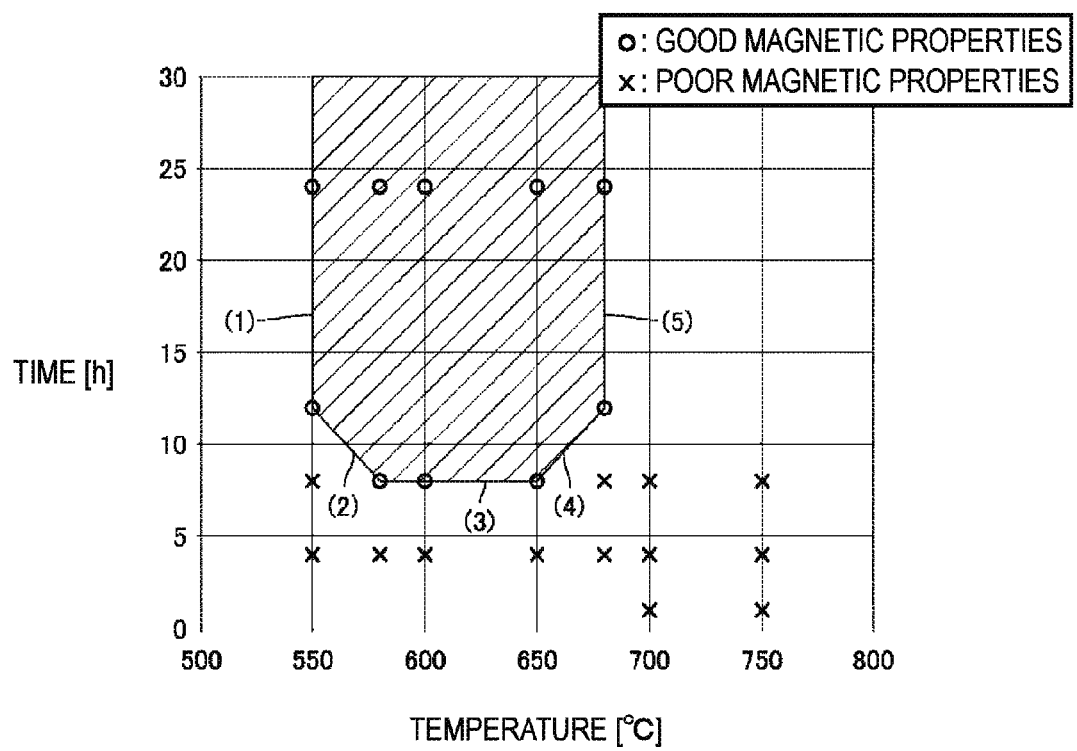
FIG. 2 is a diagram illustrating a relationship between heat treatment time and heat treatment temperature, and magnetic properties, of particle powders according to Examples 1-1 to 5-2 and Comparative Examples 1-1 to 7-3.

The following can be understood from FIG. 2.

In FIG. 2, a mark "o" is indicated for Examples 1-1 to 5-1 where good magnetic properties (that is, V×SFD≤2500 nm³) are obtained, and a mark "×" is indicated for Comparative Examples 1-1 to 7-3 where magnetic properties are deteriorated (that is, V×SFD>2500 nm³). This evaluation result demonstrates that good magnetic properties can be obtained when the heat treatment temperature [° C.] and the heat treatment time [h] fall within the range of the hatched region in FIG. 2. This region is defined by straight lines represented by the following formulas (1) to (5).

$$T=550\ [°\ C.] \quad (1)$$

$$t=-aT+256/3\ [h] \quad (2)$$

(where, in formula (2), a=2/15 [h/° C.], and 550 [° C.]<T<580 [° C.])

$$t=8\ [h]\ (where\ 580\ [°\ C.] \le T \le 650\ [°\ C.]) \quad (3)$$

$$t=aT-236/3\ [h] \quad (4)$$

(where, in formula (4), a=2/15 [h/° C.], and 650 [° C.]<T<680 [° C.])

$$T=680\ [°\ C.] \quad (5)$$

From the viewpoint of productivity, the region is preferably further defined by a straight line represented by the following formula (6) as well as the straight lines represented by the above formulas (1) to (5).

$$t=48\ [h]\ (where\ 550\ [°\ C.] \le T \le 680\ [°\ C.]) \quad (6)$$

The following can be understood from Table 3 and Table 4.

Examples 9-1 to 9-3

When the added amount of TiO₂ to the hexagonal ferrite-forming substance is reduced, the average particle thickness hardly changes while the average particle size increases. That is, the axial ratio increases.

Therefore, from the viewpoint of decreasing the size of the particle powder and reducing the axial ratio, it is considered that TiO₂ is preferably added to the hexagonal ferrite-forming substance.

Examples 8-1 to 9-3

When CoO is added to the hexagonal ferrite-forming substance, the saturation magnetization σs decreases.

On the other hand, when ZnO is added to the hexagonal ferrite-forming substance, the saturation magnetization σs increases. However, although the average particle thickness hardly changes, the average particle size increases. That is, the axial ratio increases. The above-described tendency is not dependent on the content of TiO₂ relative to the hexagonal ferrite-forming substance.

Therefore, for achieving a good saturation magnetization σs while suppressing increase of the average particle size, it is considered that both CoO and ZnO are preferably added to the hexagonal ferrite-forming substance.

The following can be understood from Table 5 and Table 6.

When the mixed amount of Na₂B₄O₇ as the glass-forming substance reaches 50 mol % or more, the amount of the glass-forming component becomes excessively large, causing precipitation of the hexagonal ferrite particle powder to become difficult.

When the mixed amount of Na₂B₄O₇ as the glass-forming substance reaches 30 mol % or less, precipitation of the non-magnetic particle increases, causing manufacture of the hexagonal ferrite particle powder to become difficult.

Therefore, the mixed amount of $Na_2B_4O_7$ as the glass-forming substance is preferably more than 30 mol % and less than 50 mol %.

Although embodiments of the present technology have been specifically described above, the present technology is not limited to the above-described embodiments, which can be variously modified based on the technical idea of the present technology.

For example, the structures, methods, processes, shapes, materials, and numerical values described in the above-described embodiments are merely examples, and the structures, methods, processes, shapes, materials and numerical values different from these may be used as necessary.

Also, the structures, methods, processes, shapes, materials and numerical values described in the above embodiments can be combined with each other as long as the gist of the present technology is not departed.

Also, although the hexagonal ferrite particle includes barium ferrite as a main component in the above-described embodiments, the hexagonal ferrite particle may alternatively include strontium ferrite as a main component. In such a case, strontium carbonate ($SrCO_3$) or strontium oxide (SrO), for example, may be used in place of barium carbonate, as the hexagonal ferrite-forming substance.

Additionally, the present technology may also be configured as below.

(1)
A magnetic recording medium including:
a substrate; and
a magnetic layer including a ferrimagnetic particle powder,
wherein a product (V×SFD) of a particle volume V and a holding force distribution SFD of the ferrimagnetic particle is equal to or less than 2500 $nm^3$.

(2)
The magnetic recording medium according to (1), wherein the ferrimagnetic particle is a hexagonal ferrite particle.

(3)
The magnetic recording medium according to (1) or (2), wherein the ferrimagnetic particle has an axial ratio of equal to or less than 3.9.

(4)
The magnetic recording medium according to any of (1) to (3), wherein the ferrimagnetic particle has a particle volume of equal to or less than 6000 $nm^3$.

(5)
The magnetic recording medium according to any of (1) to (4), wherein the ferrimagnetic particle has a holding force distribution of equal to or less than 0.5.

(6)
The magnetic recording medium according to any of (1) to (5), wherein a ratio (Vact/V) of an activation volume Vact to a particle volume V for the ferrimagnetic particle is equal to or less than 1.5.

(7)
The magnetic recording medium according to any of (1) to (6), wherein the hexagonal ferrite particle contains Ba.

(8)
The magnetic recording medium according to (7), wherein the hexagonal ferrite particle further contains at least one selected from the group consisting of Co, Zn, and Ti.

(9)
A ferrimagnetic particle powder, wherein a product (V×SFD) of a particle volume V and a holding force distribution SFD is equal to or less than 2500 $nm^3$.

(10)
A method of manufacturing a ferrimagnetic particle powder, including:
melting a ferrimagnetic particle-forming substance and sodium borate to prepare a melt;
rapidly cooling the melt to form an amorphous body; and
performing a heat treatment to the amorphous body to obtain a ferrimagnetic particle,
wherein a temperature T [° C.] and a time t [h] of the heat treatment fall within a range defined by formulas (1) to (5) below:

$$T=550 \ [° C.] \tag{1}$$

$$t=-aT+256/3 \ [h] \tag{2}$$

(where, in formula (2), a=2/15 [h/° C.], and 550 [° C.]<T<580 [° C.])

$$t=8 \ [h] \ (where \ 580 \ [° C.] \leq T \leq 650 \ [° C.]) \tag{3}$$

$$t=aT-236/3 \ [h] \tag{4}$$

(where, in formula (4), a=2/15 [h/° C.], and 650 [° C.]<T<680 [° C.])

$$T=680 \ [° C.] \tag{5}$$

(11)
The method of manufacturing a ferrimagnetic particle powder according to (10), wherein the temperature T [° C.] and the time t [h] of the heat treatment fall within a range defined by, in addition to the formulas (1) to (5), formula (6) below:

$$t=48 \ [h] \ (where \ 550 \ [° C.] \leq T \leq 680 \ [° C.]) \tag{6}$$

(12)
The method of manufacturing a ferrimagnetic particle powder according to (10) or (11), wherein a ratio of sodium borate to a total of the ferrimagnetic particle-forming substance and sodium borate is more than 30 mol % and less than 50 mol %.

(13)
The method of manufacturing a ferrimagnetic particle powder according to any of (10) to (12), wherein the ferrimagnetic particle-forming substance contains barium carbonate and iron oxide.

(14)
The method of manufacturing a ferrimagnetic particle powder according to (13), wherein the ferrimagnetic particle-forming substance further contains at least one selected from the group consisting of cobalt oxide, zinc oxide, and titanium oxide.

(15)
A method of manufacturing a magnetic recording medium, including:
melting a ferrimagnetic particle-forming substance and sodium borate to prepare a melt;
rapidly cooling the melt to form an amorphous body;
performing a heat treatment to the amorphous body to obtain a ferrimagnetic particle powder; and
forming, on a substrate, a magnetic layer containing the ferrimagnetic particle powder,
wherein a temperature T [° C.] and a time t [h] of the heat treatment fall within a range defined by formulas (1) to (5) below:

$$T=550 \ [° C.] \tag{1}$$

$$t=-aT+256/3 \ [h] \tag{2}$$

(where, in formula (2), a=2/15 [h/° C.], and 550 [° C.]<T<580 [° C.])

$$t=8 \ [h] \ (\text{where } 580 \ [° C.] \leq T \leq 650 \ [° C.]) \quad (3)$$

$$t=aT-236/3 \ [h] \quad (4)$$

(where, in formula (4), a=2/15 [h/° C.], and 650 [° C.]<T<680 [° C.])

$$T=680 \ [° C.] \quad (5).$$

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST 10 magnetic recording medium
11 substrate
12 non-magnetic layer
13 magnetic layer

The invention claimed is:

1. A magnetic recording medium comprising:
a substrate; and
a magnetic layer including a ferrimagnetic particle powder,
wherein a product (V×SFD) of a particle volume V and a holding force distribution SFD of the ferrimagnetic particle is from 451 nm$^3$ to 2500 nm$^3$, and
wherein an average particle thickness of the ferrimagnetic particle powder is from 7 nm to 9 nm.

2. The magnetic recording medium according to claim 1, wherein the ferrimagnetic particle is a hexagonal ferrite particle.

3. The magnetic recording medium according to claim 2, wherein the hexagonal ferrite particle contains Ba.

4. The magnetic recording medium according to claim 3, wherein the hexagonal ferrite particle further contains at least one selected from the group consisting of Co, Zn, and Ti.

5. The magnetic recording medium according to claim 1, wherein the ferrimagnetic particle has an axial ratio of equal to or less than 3.9.

6. The magnetic recording medium according to claim 1, wherein the ferrimagnetic particle has a particle volume of equal to or less than 6000 nm$^3$.

7. The magnetic recording medium according to claim 1, wherein the ferrimagnetic particle has a holding force distribution of equal to or less than 0.5.

8. The magnetic recording medium according to claim 1, wherein a ratio (Vact/V) of an activation volume Vact to a particle volume V for the ferrimagnetic particle is equal to or less than 1.5.

9. The magnetic recording medium according to claim 1, wherein the ferrimagnetic particle has an axial ratio from 1.9 to 3.9.

10. The magnetic recording medium according to claim 1, wherein the hexagonal ferrite particle includes strontium ferrite as a main component.

11. A ferrimagnetic particle powder, wherein a product (V×SFD) of a particle volume V and a holding force distribution SFD is from 451 nm$^3$ to 2500 nm$^3$,
wherein an average particle thickness of the ferrimagnetic particle powder is from 7 nm to 9 nm.

* * * * *